United States Patent [19]
Sasaki

[11] Patent Number: 5,991,105
[45] Date of Patent: Nov. 23, 1999

[54] RECORDING APPARATUS WHEREIN THE RECORDING CIRCUIT USES A FIRST POWER SUPPLY OR A SECOND POWER SUPPLY

[75] Inventor: Yoshiyuki Sasaki, Yokohama, Japan

[73] Assignee: Canon Kabushiki Kaisha, Japan

[21] Appl. No.: 08/529,538

[22] Filed: Sep. 18, 1995

[30] Foreign Application Priority Data

Sep. 26, 1994 [JP] Japan .................................. 6-229387

[51] Int. Cl.$^6$ ............................................... G11B 5/09
[52] U.S. Cl. ............................................... 360/46; 330/297
[58] Field of Search ............................ 360/46; 348/372; 330/297

[56] References Cited

U.S. PATENT DOCUMENTS

| | | | |
|---|---|---|---|
| 5,329,408 | 7/1994 | Fuji | 360/46 |
| 5,359,466 | 10/1994 | Fuji et al. | 360/46 |
| 5,446,905 | 8/1995 | Koshiishi | 395/750 |
| 5,523,857 | 6/1996 | Fukushima | 386/125 |

*Primary Examiner*—Aristotelis M. Psitos
*Assistant Examiner*—Regina Y. Neal
*Attorney, Agent, or Firm*—Fitzpatrick, Cella, Harper & Scinto

[57] ABSTRACT

A recording apparatus includes a first power supply having a first output voltage, a second power supply having a second output voltage different from the first output voltage, and a recording circuit for recording input digital data on a recording medium selectively using the first power supply or the second power supply. The recording circuit selectively uses the first power supply or the second power supply in accordance with a state of the input digital data. It is thereby possible to reduce power consumption in the circuitry of the apparatus during recording.

52 Claims, 9 Drawing Sheets

FIG.1
PRIOR ART

| DATA | SWITCH 212 | SWITCH 216 | CONSTANT-CURRENT SOURCE 214 | CONSTANT-CURRENT SOURCE 218 |
|---|---|---|---|---|
| 1 | ON | OFF | OFF | CONSTANT CURRENT Ic |
| 0 | OFF | ON | CONSTANT CURRENT Ic | OFF |

FIG.2
PRIOR ART

FIG.4(a) PRIOR ART — RECORDING CURRENT

FIG.4(b) PRIOR ART — VOLTAGE AT NODE 220

FIG.4(c) PRIOR ART — VOLTAGE AT NODE 222

| DATA | SWITCH 110 | SWITCH 111 | CONSTANT-CURRENT SOURCE 103 | CONSTANT-CURRENT SOURCE 104 |
|---|---|---|---|---|
| 1 | OFF | ON | CONSTANT CURRENT Ic | OFF |
| 0 | ON | OFF | OFF | CONSTANT CURRENT Ic |

FIG.7

FIG.8(a) RECORDING CURRENT

FIG.8(b) VOLTAGE AT NODE 107

FIG.8(c) VOLTAGE AT NODE 108

FIG.8(d) OUTPUT CURRENT OF POWER SUPPLY 11

FIG.8(e) OUTPUT CURRENT OF POWER SUPPLY 10

RECORDING APPARATUS WHEREIN THE RECORDING CIRCUIT USES A FIRST POWER SUPPLY OR A SECOND POWER SUPPLY

BACKGROUND OF THE INVENTION

1. Field of the Invention

This invention relates to a recording apparatus, and more particularly, to control of recording current when recording a digital signal on a magnetic tape using a magnetic head.

2. Description of the Related Art

A digital VCR (video cassette recorder) for recording a digital signal on a magnetic tape using a magnetic head is known as an apparatus for recording a signal on a recording medium.

Figure 1:
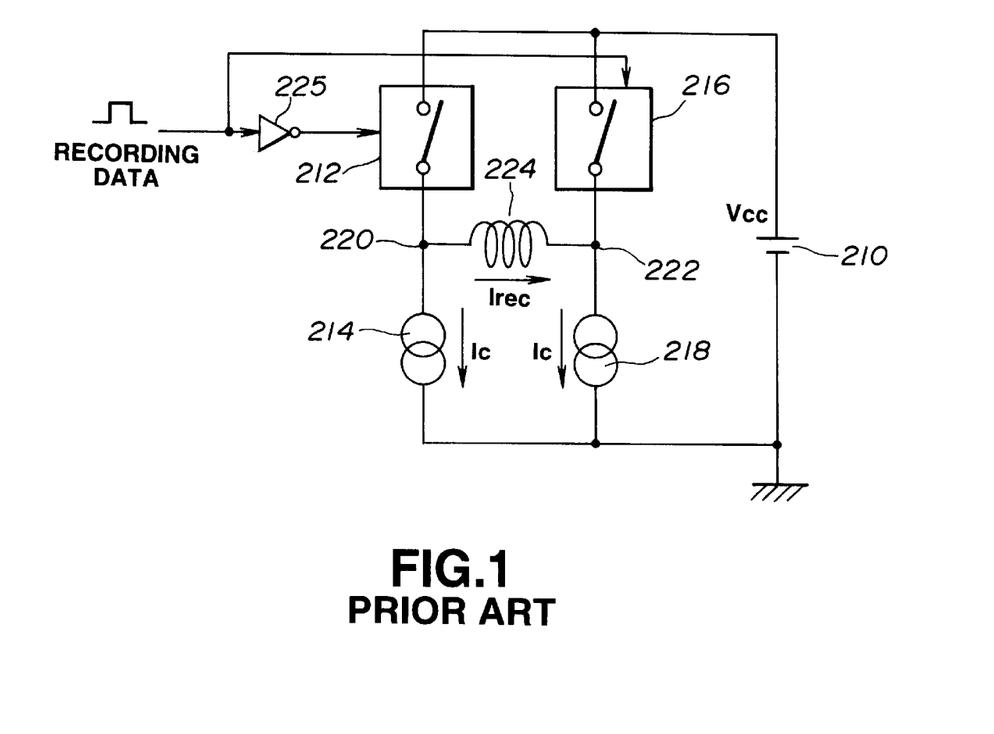
FIG. 1 is a schematic diagram illustrating the configuration of a conventional head driving circuit.

FIG. 1 is a schematic block diagram of circuitry described in "LSI/IC for DCC", National Technical Report, Vol. 39, No. 6, December 1993, as an example of a magnetic-head driving circuit for controlling recording current passing through a head in such a digital VCR. In FIG. 1, a series circuit comprising a switch 212, controlled by an output from an inverting circuit 225, and a first constant-current source 214, which can be turned on and off, and a series circuit comprising a switch 216, controlled in accordance with recording data, and a second constant-current source 218, which can be turned on and off, are connected in parallel to a power supply 210 having an output voltage $V_{cc}$, and a magnetic head 224 is connected between a node 220, where the switch 212 and the constant-current source 214 are connected, and a node 222, where the switch 216 and the constant-current source 218 are connected.

Figure 2:
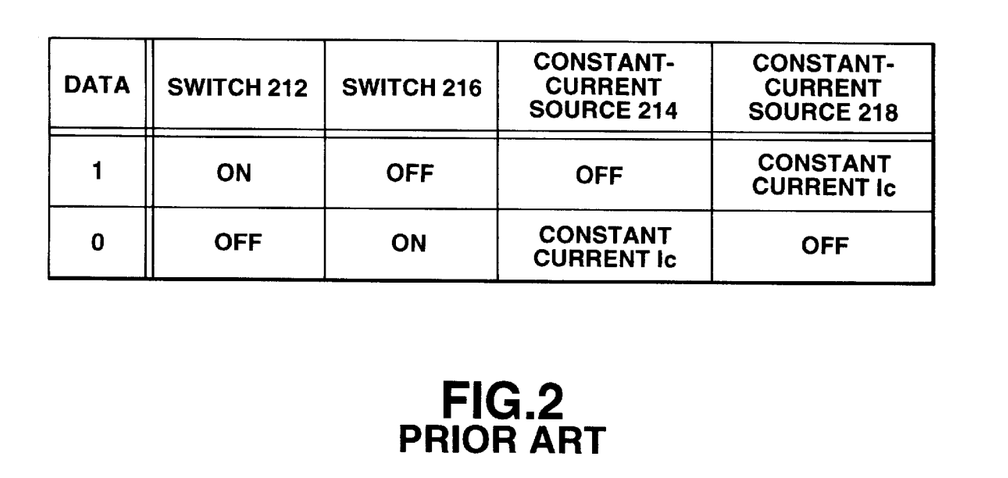
FIG. 2 is a diagram illustrating the operation of the circuit shown in FIG. 1.

FIG. 2 illustrates the relationship between the values of digital data to be recorded, and the operations of the switches 212 and 216 and the constant-current sources 214 and 218. That is, in the circuitry shown in FIG. 1, when the value of data to be recorded is "1", the switch 212 is switched on, the switch 216 is switched off, the constant-current source 214 is turned off, and the constant-current source 218 is turned on, so that a constant current $I_c$ determined by the constant-current source 218 flows from the plus terminal to the minus terminal of the power supply 210 via the switch 212, the magnetic head 224 and the constant-current source 218. Accordingly, the current $I_c$ passes through the magnetic head 224 from the node 220 toward the node 222. On the other hand, when the value of data to be recorded is "0", the switch 212 is switched off, the switch 216 is switched on, the constant-current source 214 is turned on, and the constant-current source 218 is turned off, so that the constant current $I_c$ determined by the constant-current source 214 flows from the plus terminal to the minus terminal of the power supply 210 via the switch 216, the magnetic head 224 and the constant-current source 214. Accordingly, the current $I_c$ passes through the magnetic head 224 from the node 222 toward the node 220.

If the current passing through the magnetic head 224 from the node 220 toward the node 222 is assumed to be positive, statically, a recording current $I_{rec}$ passing through the magnetic head 224 equals $+I_c$ and $-I_c$ when data to be recorded is "1" and "0", respectively.

As is well known, when a constant current passes through an inductive load, such as the magnetic head 224 or the like, the following voltage e appears between terminals of the load for a change in the passing current i:

$$e = -L(di/dt)(V),$$

where L is the inductance of the load.

Figures 3A, 3B:
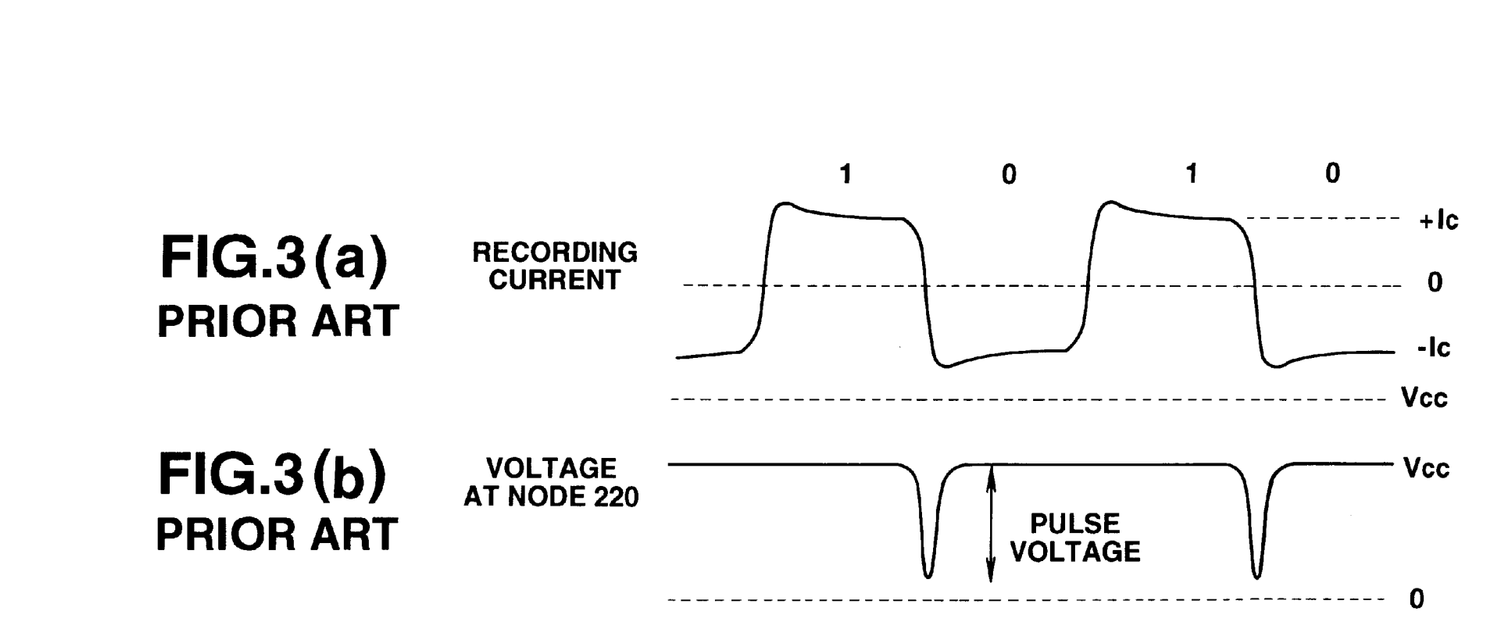
FIG. 3(a) is a diagram illustrating a recording current in the circuit shown in FIG. 1.
FIGS. 3(b) and 3(c) are diagrams illustrating voltages at two terminals of a head in the circuit shown in FIG. 1.
Figure 3C:
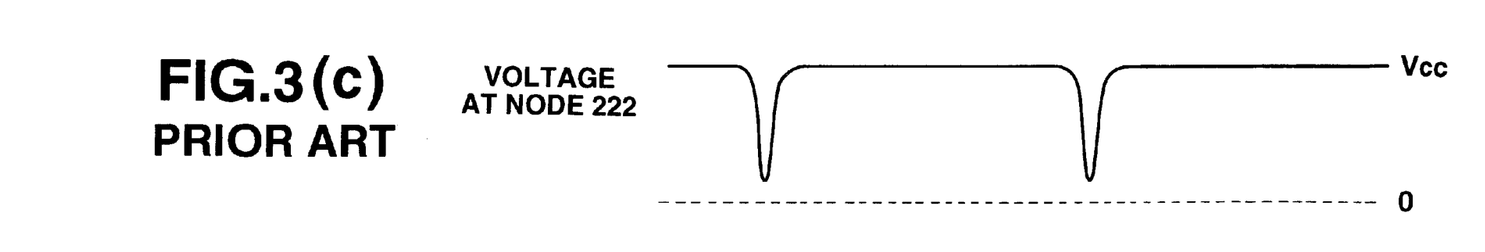
Figure 4A:
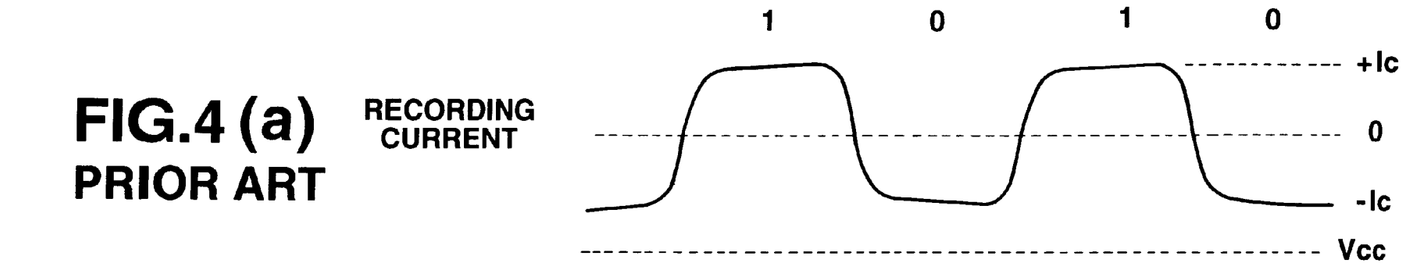
FIG. 4(a) is a diagram illustrating a recording current in the circuit shown in FIG. 1.
Figure 4B:
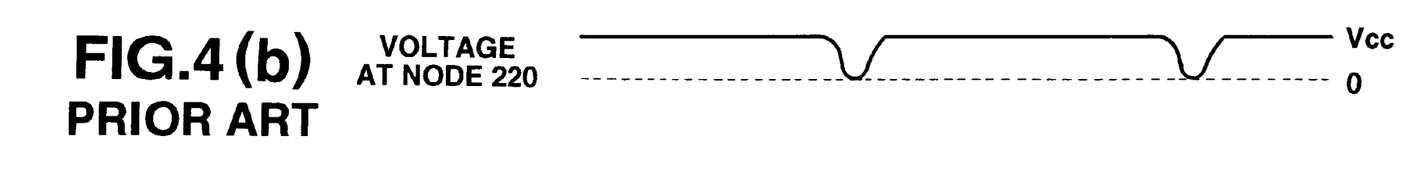
FIGS. 4(b) and 4(c) are diagrams illustrating voltages at two terminals of the head in the circuit shown in FIG. 1.
Figure 4C:
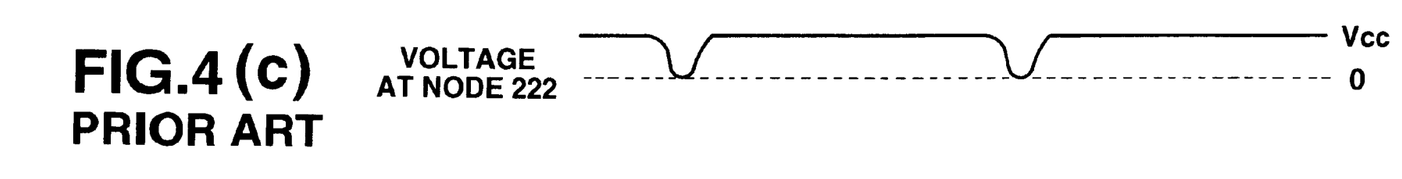

In the circuitry shown in FIG. 1, if it is assumed that the switches 212 and 216 are ideal and their on-resistance equals zero, negative transient pulse voltages as shown in FIGS. 3(b) and 3(c) are generated. FIG. 3(a) illustrates the waveform of the recording current passing through the magnetic head 224. The output voltage $V_{cc}$ of the power supply 210 must be selected so as to provide pulse voltages corresponding to the inductance L of the magnetic head 224, the transfer rate of digital data to be recorded, and the value of the recording current. For example, if the output voltage $V_{cc}$ of the current supply 210 is too low, pulse voltages at the nodes 220 and 222 are too low, as shown in FIGS. 4(b) and 4(c), respectively, so that rise and fall of the recording current are not sharp, as shown in FIG. 4(a). Normal recording cannot be performed in this state.

Recently, camcorders, in each of which a VCR and a video camera are integrated, have been rapidly popularized, so that video recording is ordinarily and easily performed outdoors using a battery as a power supply. When providing a digital VCR unit, it is desired to reduce power consumption in order to increase the recordable time period when the battery of the VCR unit is in a fully charged state.

However, the above-described conventional magnetic-head driving circuit has the following problems. That is, a high voltage for providing pulse voltages required at the nodes 220 and 222 is always applied to one of the constant-current sources 214 and 218, thereby increasing power consumption in the constant-current sources 214 and 218, and resulting in a short recording time period in the case of battery drive.

SUMMARY OF THE INVENTION

It is an object of the present invention to solve the above-described problems.

It is another object of the present invention to provide a recording apparatus having small power consumption.

According to one aspect, the present invention, which achieves these objectives, relates to a recording apparatus, comprising first power-supply means having a first output voltage, second power-supply means having a second output voltage different from the first output voltage, and recording means for recording input digital data on a recording medium using either the first power-supply means or the second power-supply means. The recording means uses either the first power-supply means or the second power-supply means in accordance with a state of the input digital data.

According to another aspect, the present invention relates to a recording apparatus, comprising head means for recording data on a recording medium by a current corresponding to input digital data passed through the head means. The head means has two terminals. The apparatus further comprises first power-supply means having a first output voltage, second power-supply means having a second output voltage higher than the first output voltage, and control means for selectively applying the first voltage or the second voltage between the terminals of the head.

According to still another aspect, the present invention relates to a recording apparatus, comprising first power-supply means having a first output voltage, second power-supply means having a second output voltage different from the first output voltage, and recording means for recording an input signal on a recording medium using either the first power-supply means or the second power-supply means. The recording means uses either the first power-supply means or the second power supply means in accordance with whether or not the waveform of the input signal is a pulse-shaped waveform.

The foregoing and other objects, advantages and features of the present invention will become more apparent from the following description of the preferred embodiments taken in conjunction with the accompanying drawings.

DETAILED DESCRIPTION OF THE PREFERRED EMBODIMENTS

Preferred embodiments of the present invention will now be described with reference to the drawings.

Figure 5:
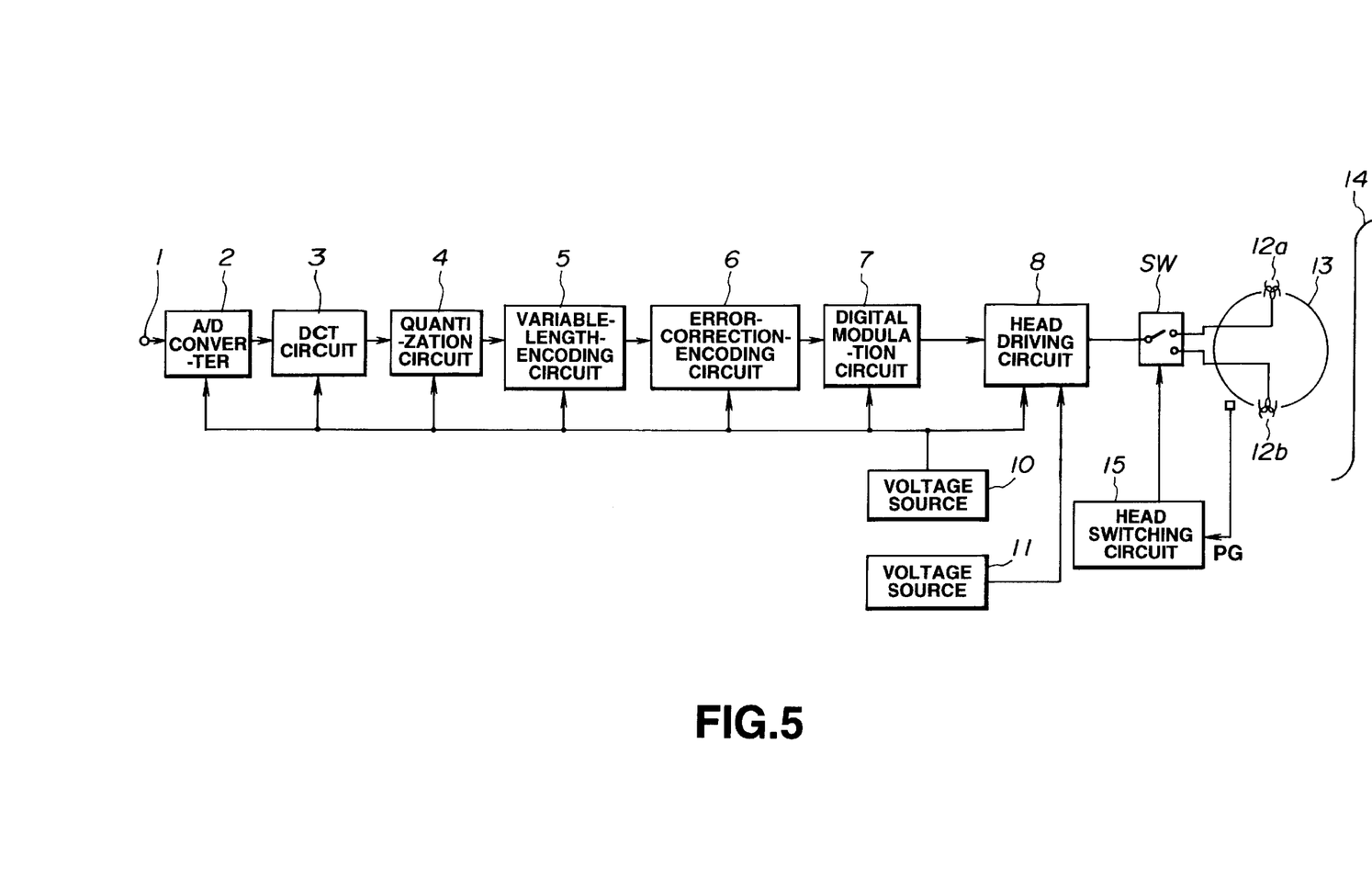
FIG. 5 is a block diagram illustrating the configuration of a digital VCR according to an embodiment of the present invention.

First, a description will be provided of the operation of a digital VCR according to an embodiment of the present invention with reference to FIG. 5.

In FIG. 5, a video signal input from a terminal 1 is converted into a digital signal by an A/D (analog-to-digital) converter 2, and is input to a DCT (discrete cosine transform) circuit 3. The DCT circuit 3 converts the input data from the spatial domain into data in a frequency domain by performing DCT processing of the digital signal in units of a block comprising 8 pixels×8 lines of the digital signal, and outputs the resultant signal to a quantization circuit 4.

The recording signal is quantized by the quantization circuit 4 using predetermined quantization coefficients, and the amount of information of the signal is compressed by being subjected to variable-length encoding processing, such as Huffman coding or the like, by a variable-length-encoding circuit 5. The signal is then output to an error-correction-encoding circuit 6.

The error-correction-encoding circuit 6 performs error correction encoding by adding parity data to the recording signal, and outputs the resultant signal to a digital modulation circuit 7. The digital modulation circuit 7 performs digital modulation processing of the recording signal to suppress its DC component, and multiplexes a pilot-signal component for tracking control during a reproducing operation with the signal.

The modulated recording digital signal is output to a head driving circuit 8. The head driving circuit 8 supplies heads 12a and 12b with current in accordance with the recording signal via a switch SW, as will be described later, to record the signal on a magnetic tape 14.

The heads 12a and 12b are mounted on a rotating drum 12 with a phase difference of 180° so as to alternately trace the magnetic tape 14. The switch SW is switched by a head switching signal formed by a head switching circuit 15 using a signal PG indicating the rotating phase of the drum 13.

Reference numeral 10 represents a voltage source having a voltage $V_{cc}1$, which supplies a recording current, and also serves as a driving power supply for respective circuits of the apparatus. Reference numeral 11 represents a voltage source having a voltage $V_{cc}2$, which is used for controlling the recording current, as will be described later.

Next, a description will be provided of the head driving circuit 8 shown in FIG. 5.

Figure 6:
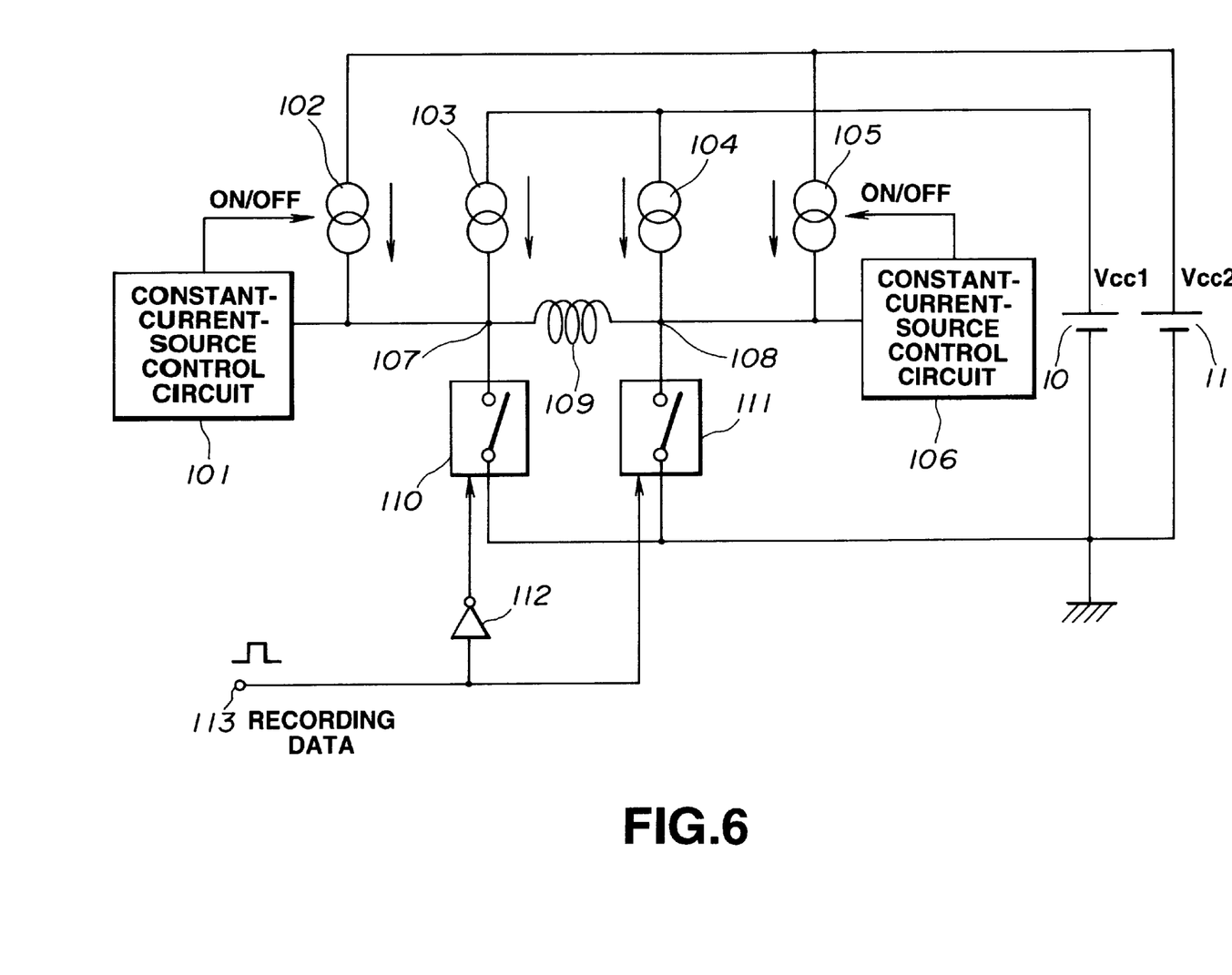
FIG. 6 is a schematic diagram illustrating an example of the configuration of a head driving circuit shown in FIG. 5.

FIG. 6 is a schematic block diagram illustrating an example of the configuration of the head driving circuit 8 shown in FIG. 5. In FIG. 6, reference numeral 10 represents a power supply having an output voltage $V_{cc}1$, and reference numeral 11 represents a power supply having an output voltage $V_{cc}2$, and $V_{cc}2>V_{cc}1$. A series circuit comprising a constant-current source 103, which outputs a constant current $I_c$ and which can be subjected to on/off control, and a switch 110, and a series circuit comprising a constant-current source 104, which outputs the constant current $I_c$ and which can be subjected to on/off control, and a switch 111 are connected in parallel to the power supply 10.

The switches 110 and 111 are controlled by recording data supplied to a terminal 113 from the digital modulation circuit 7 shown in FIG. 5, as will be described later.

The magnetic head 12a or 12b is connected between a node (or a terminal) 107 where the constant-current source 103 and the switch 110 are connected, and a node (or a terminal) 108 where the constant-current source 104 and switch 111 are connected (in FIG. 6, the magnetic head 12a or 12b will be represented by an inductance 109). The output of the power supply 11 is connected to the node 107 via a constant-current source 102, which outputs the constant current $I_c$ and which can be subjected to on/off control, and also to the node 108 via a constant-current source 105, which outputs the constant current $I_c$ and which can be subjected to on/off control. Constant-current-source control circuits 101 and 106 perform on/off control of the constant-current sources 102 and 105 in accordance with the potentials of the nodes 107 and 108, respectively.

Figure 7:
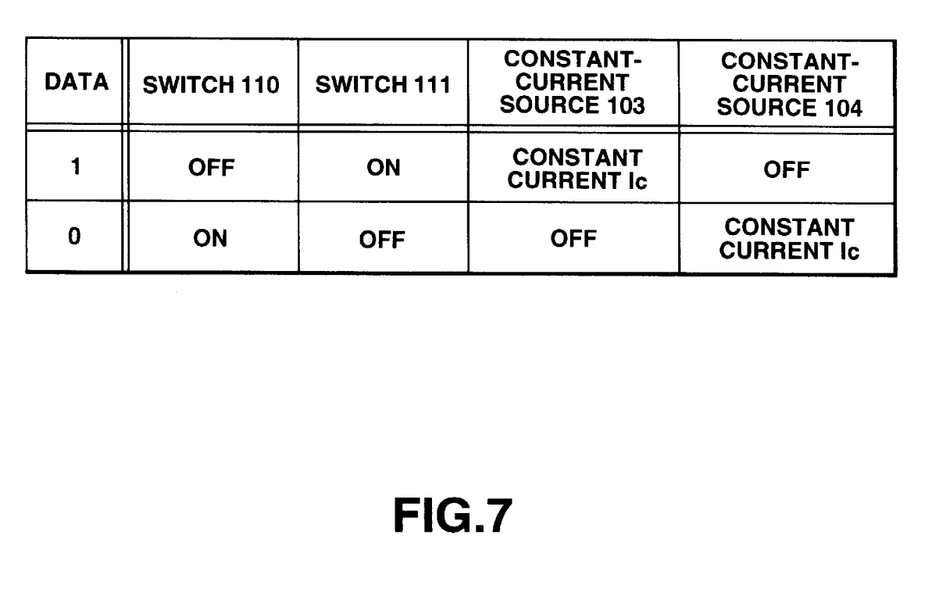
FIG. 7 is a diagram illustrating the operation of the circuit shown in FIG. 6.

FIG. 7 is a diagram illustrating the relationship between the values of digital data input from the terminal 113 shown in FIG. 6, and the operations of the switches 110 and 111 and the constant-current sources 103 and 104. That is, in the present embodiment, when the value of digital data to be recorded is "1", this data is inverted by an inverter 112 and is supplied to the switch 110 to switch it off. The data is also directly supplied to the switch 111 to switch it on. The constant-current source 103 is turned on, and the constant-current source 104 is turned off, so that the constant current $I_c$ determined by the constant-current source 103 flows from the plus terminal to the minus terminal of the power supply 10 via the node 107, the magnetic head 109, the node 108 and the switch 111. Accordingly, the current $I_c$ passes through the magnetic head 109 from the node 107 toward the node 108.

On the other hand, when the value of data to be recorded is "0", the switch 110 is switched on, the switch 11 is switched off, the constant-current source 103 is turned off, and the constant-current source 104 is turned on, so that the constant current $I_c$ determined by the constant-current source 104 flows from the plus terminal to the minus terminal of the power supply 10 via the node 108, the magnetic head 109, the node 107 and the switch 110. Accordingly, the current $I_c$ passes through the magnetic head 109 from the node 108 toward the node 107.

The above-described operations are the same as those of the circuitry shown in FIG. 1. That is, if the current passing through the magnetic head 109 from the node 107 toward the node 108 is; assumed to be positive, statically, a recording current $I_{rec}$ passing through the magnetic head 109 equals $+I_c$ and $-I_c$ when data to be recorded is "1" and "0", respectively.

Next, operations when the polarity of the recording current changes as a result of inversion of digital data to be recorded will be described with reference to FIGS. 8(a) through 8(e).

Figure 8A:
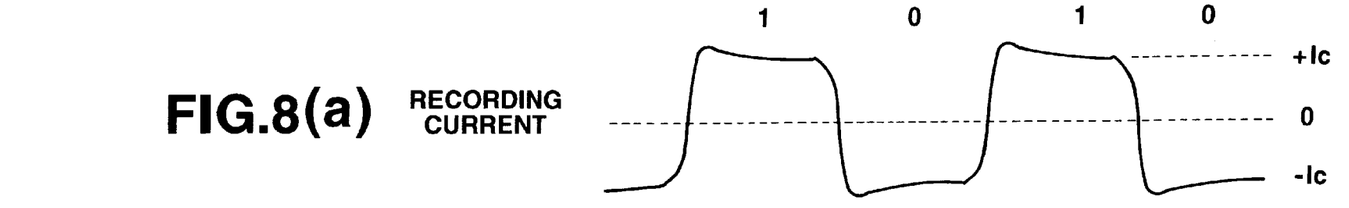
FIG. 8(a) is a diagram illustrating a recording current in the circuit shown in FIG. 6.
Figure 8B:
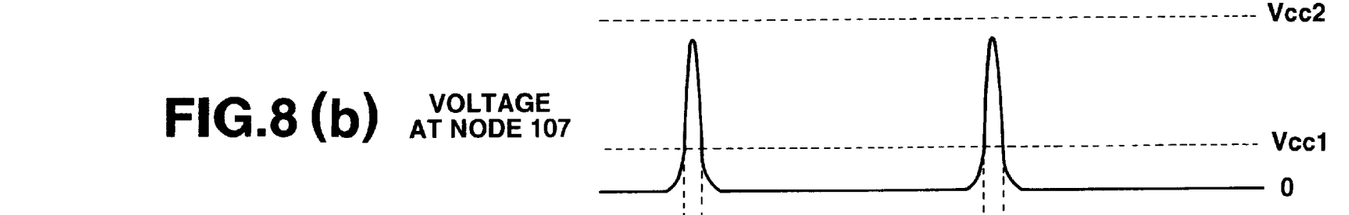
FIGS. 8(b) and 8(c) are diagrams illustrating voltages at two terminals of a head in the circuit shown in FIG. 6.
Figure 8C:
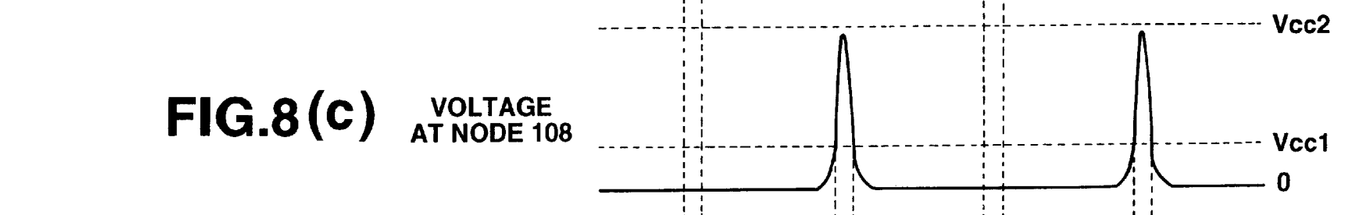
Figure 8D:
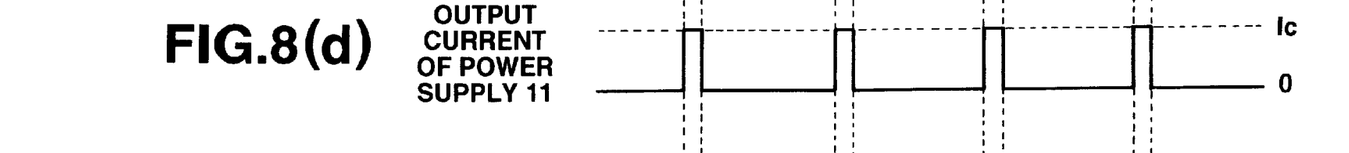
FIGS. 8(d) and 8(e) are diagrams illustrating output currents of power supplies in the circuit shown in FIG. 6.
Figure 8E:
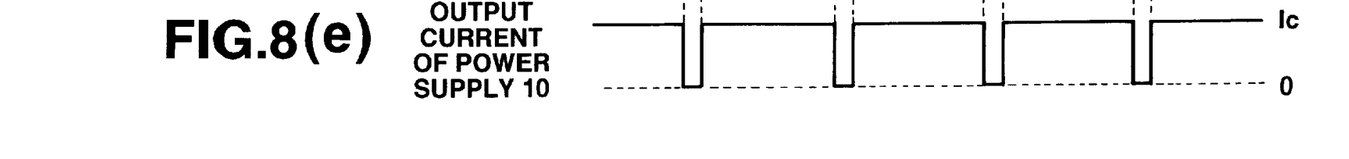

FIGS. 8(a) through 8(e) illustrate waveforms at respective portions when digital data to be recorded alternately changes as "1", "0", "1" and "0". FIG. 8(a) illustrates a recording current $I_{rec}$; FIG. 8(b) illustrates the voltage at the node 107; FIG. 8(c) illustrates the voltage at the node 108; FIG. 8(d) illustrates the value of the output current of the power supply 11; and FIG. 8(e) illustrates the value of the output current of the power supply 10.

In the present embodiment, when the digital data supplied from the terminal 113 changes and the recording current is thereby inverted, pulse voltages necessary at the nodes 107 and 108 are positive and higher than the output voltage $V_{cc}1$ of the power supply 10, as shown in FIGS. 8(b) and 8(c). This is because there are provided the power supply 11 having an output voltage higher than that of the power supply 10, and the current supply circuits 101, 102, 106 and 105 for supplying currents, which are insufficient from only the power supply 10, when the recording current changes.

That is, the constant-current-source control circuit 101 monitors the potential of the node 107, and turnes on the constant-current source 102 when the potential of the node 107 approaches $V_{cc}1$. As a result, the potential of the node 107 has a value obtained by subtracting the amount of voltage drop caused by the constant-current source 102 from the output voltage $V_{cc}2$ of the power supply 11 irrespective of voltage drop or induced voltage in the magnetic head 109. Similarly, the constant-current-source control circuit 106 turns on the constant-current source 105 when the potential of the node 108 approaches $V_{cc}1$, so that the potential of the node 108 has a value obtained by subtracting the amount of voltage drop caused by the constant-current source 105 from the output voltage $V_{cc}2$ of the power supply 11.

As shown in FIG. 8(d), the power supply 11 supplies current while the recording current changes, i.e., while the data is inverted from "1" to "0" or from "0" to "1". On the other hand, as shown in FIG. 8(e), the power supply 10 supplies current during other periods. In general, digital data does not systematically change at every bit, but has random periods. Hence, the power supply 10 principally supplies the necessary current for the operations. Since the potentials of the nodes 107 and 108 can be higher than the potential of the power supply 11, the output voltage $V_{cc}1$ of the power supply 10 can be lower than in the case of the above-described conventional approach. Accordingly, power consumption during data recording can be greatly reduced.

As shown in FIG. 5, in the VCR of the present embodiment, the voltage source used for the head driving circuit is also used for the respective circuits of the apparatus. Hence, power consumption can be further reduced by lowering the voltage of the power supply 10.

A description will now be provided of an example of a specific design for the head driving circuit shown in FIG. 6.

Figure 9:
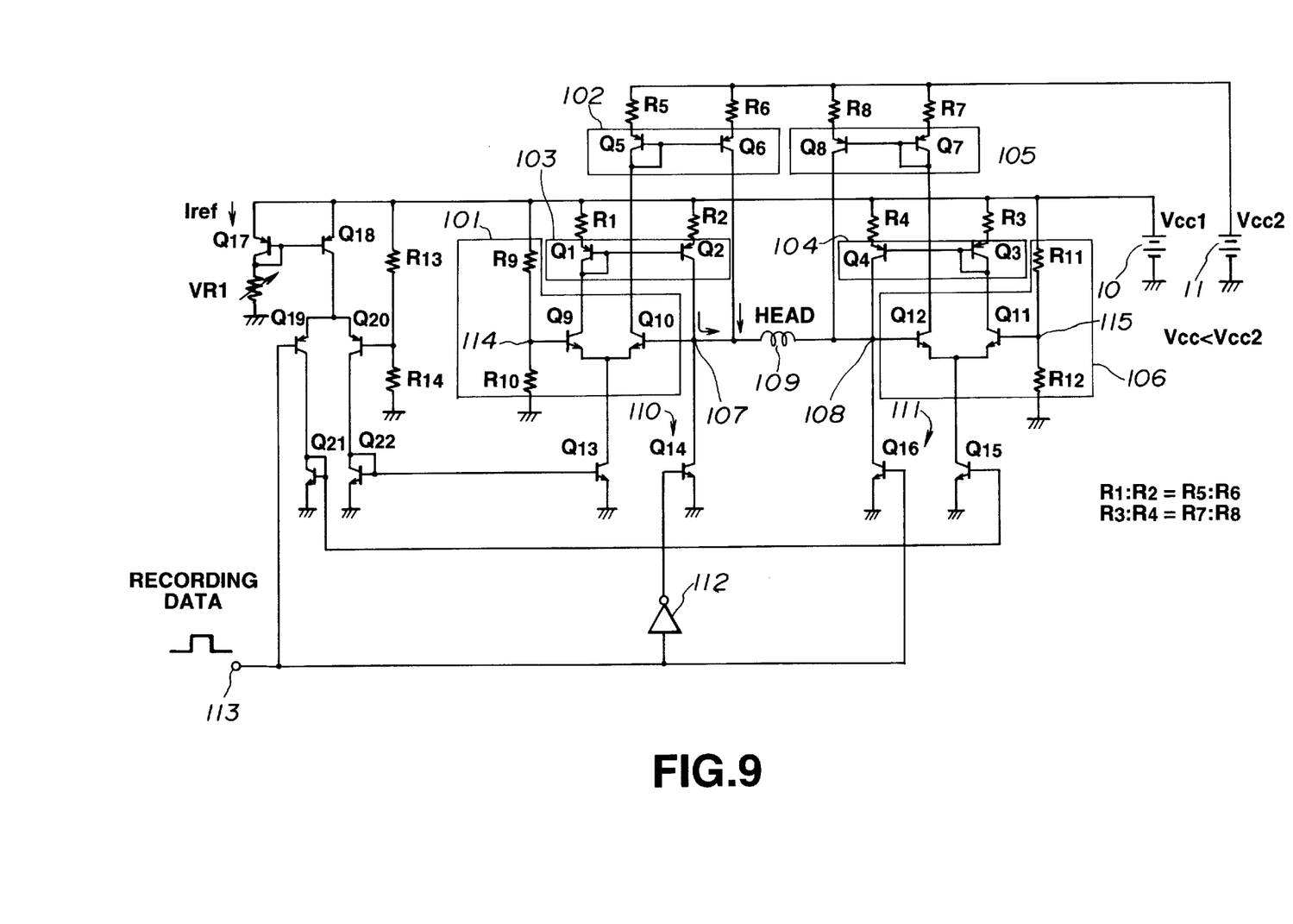
FIG. 9 is a diagram illustrating the more detailed configuration of the circuit shown in FIG. 6.

FIG. 9 is a diagram illustrating an example of a specific design for the circuit shown in FIG. 6 using transistors, resistors and the like.

In FIG. 9, transistors $Q_1$ and $Q_2$, $Q_3$ and $Q_4$, $Q_5$ and $Q_6$, and $Q_7$ and $Q_8$ operate as the constant-current sources 103, 104, 102 and 105, respectively. Resistors are set so that $R_1:R_2=R_5:R_6$, and $R_3:R_4=R_7:R_8$. Transistors $Q_{14}$ and $Q_{16}$ operate as the switches 110 and 111, respectively. Transistors $Q_9$ and $Q_{10}$ and resistors $R_9$ and $R_{10}$ operate as the constant-current-source control circuit 101, and transistors $Q_{11}$ and $Q_{12}$ and resistors $R_{11}$ and $R_{12}$ operate as the constant-current-source control circuit 106.

A variable resistor $VR_1$ determines a constant current $I_{ref}$ to be passed through the head 109. The constant current $I_{ref}$ determined by the $VR_1$ passes from a transistor $Q_{18}$ to transistors $Q_{19}$ and $Q_{20}$. The current $I_{ref}$ is supplied to transistors $Q_{13}$ and $Q_{15}$ by turning on and off the transistors $Q_{19}$ and $Q_{20}$ in accordance with "1" and "0" of recording data input from the terminal 113, respectively.

In this configuration, when recording data is "1" in a stationary state, since a high-level signal is input from the terminal 113, the transistor $Q_{13}$ becomes a constant-current source having the value $I_{ref}$, the transistor $Q_{16}$ is turned on, and the transistors $Q_{14}$ and $Q_{15}$ are turned off.

When the values of resistors $R_9$ and $R_{10}$ are determined so that the potential of the node 107 is lower than the potential of the node 114 determined by the values of the resistors $R_9$ and $R_{10}$ in a stationary state, the transistor $Q_9$ is turned on, so that the constant current $I_{ref}$ passes through the transistors $Q_9$ and $Q_1$. The current is amplified to an $R_1/R_2$ multiple, and the amplified current passes through the transistor $Q_2$, the head 109 and the transistor $Q_{16}$.

In a transient state in which recording data changes from "0" to "1", the potential of the node 107 increases and approaches the potential of the node 114. Finally, the potential of the node 107, i.e., the base voltage of the transistor $Q_{10}$, becomes higher than the potential of the node 114, i.e., the base voltage of the transistor $Q_9$.

As the base voltage of the transistor $Q_{10}$ increases, the emitter voltage increases. Since the emitter voltage of the transistor $Q_{10}$ equals the emitter voltage of the transistor $Q_9$, and the base voltage of the transistor $Q_9$ does not change, a reverse voltage is applied to the transistor $Q_9$, so that the transistor $Q_9$ is turned off when the potential of the node 107 increases. When the transistor $Q_9$ is turned off, current does not flow from the transistor $Q_2$. Instead, the constant current $I_{ref}$ passes through the transistors $Q_{10}$ and $Q_5$. The current is amplified to an $R_5/R_6$ multiple, and the amplified current passes through the transistor $Q_6$, the head 109 and the transistor $Q_{16}$.

When the transient portion caused by the inversion of the recording data passes, the potential of the node 107 decreases, and the above-described operation in the stationary state is performed.

When recording data is "0" or when recording data is inverted from "1" to "0", an operation inverted from the above-described operation with respect to the right and the left in FIG. 9 is performed.

As described above, in the present embodiment, when recording data is "1" or "0" in a stationary state, the current source is driven by the power supply 10 having a low voltage. In a transient state in which recording data is inverted, recording is performed using a current from a current source driven by the power supply 11 having a high voltage by detecting the voltage of a recording signal. It is thereby possible to reduce power consumption during recording.

In the above-described embodiment, the magnetic head 109 is directly connected between the nodes 107 and 108. In general, however, a rotary transformer is connected between the nodes 107 and 108 in a VCR. It is apparent that, also in such a case, the same operation as in the above-described embodiment can be performed.

Although in the above-described embodiment, the switch 110 is connected between the node 107 and ground, and the switch 111 is connected between the node 108 and ground, constant-current sources, which can be subjected to on/off control, having a current supply capability higher than that of the constant-current sources 103 and 104 may be used instead of the switches 110 and 111. Also in such a case, the same operation as in the above-described embodiment can be performed.

In the above-described embodiment, digital data is recorded by selectively using the power supplies 10 and 11 having high output voltages. However, a power supply having a voltage of $V_{cc}2-V_{cc}1=V_{cc}3$ and a power supply having the above-described voltage $V_{cc}1$ may be provided, and one constant-current source may be driven by connecting the power supply having the voltage $V_{cc}3$ and the power supply having the voltage $V_{cc}1$ in series in a transient state.

Figure 10:
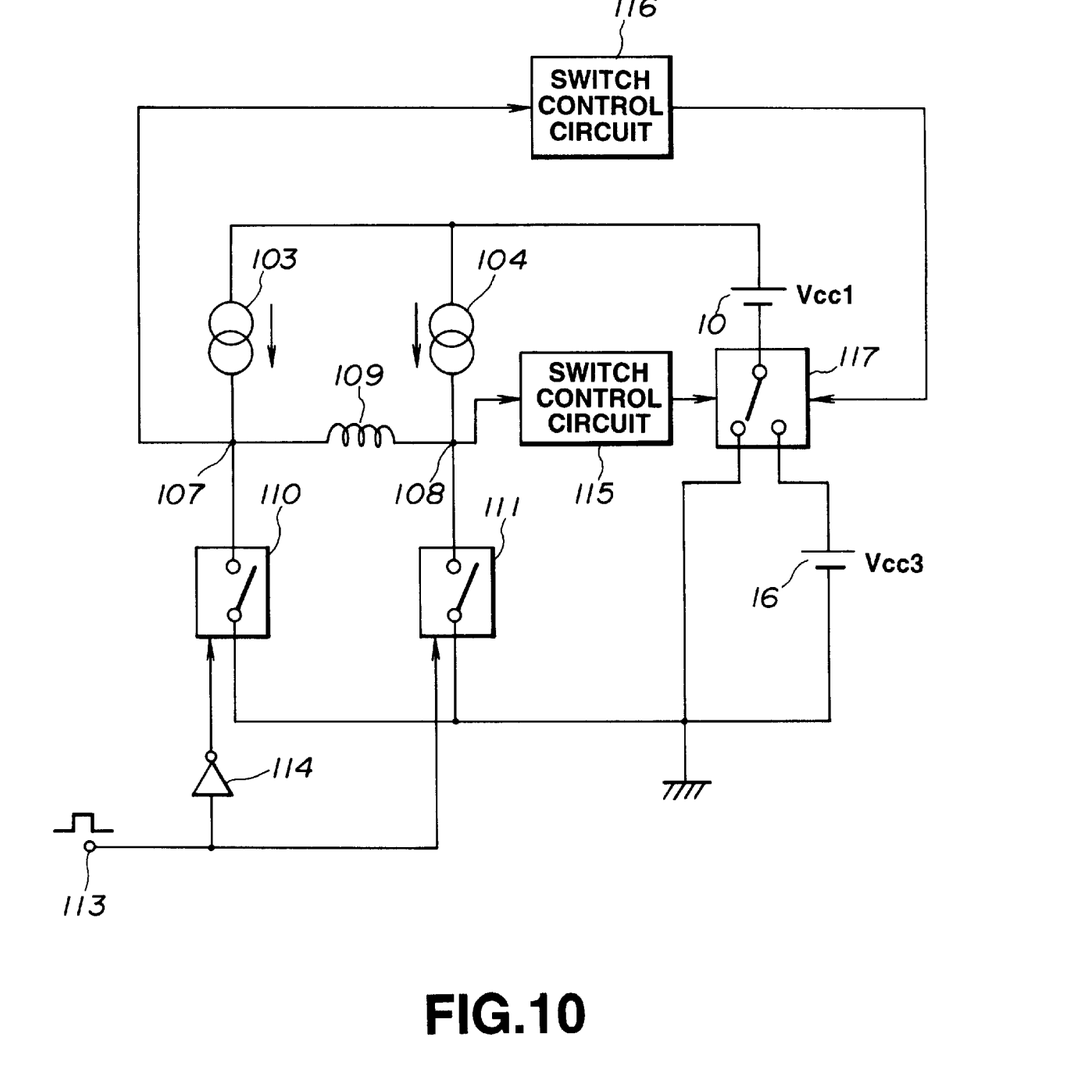
FIG. 10 is a schematic diagram illustrating another example of the configuration of the head driving circuit shown in FIG. 5.

In such a case, a configuration as shown in FIG. 10 is adopted.

In FIG. 10, switch control circuits 115 and 116 control a switch 117 by detecting the potentials of nodes 107 and 108 when recording data is "0" or "1".

That is, in FIG. 10, when recording data is "1" in a stationary state, the switch control circuit 116 connects the switch 117 to the ground side, so that a current source 103 is driven with a voltage $V_{cc}1$. In a transient state in which recording data changes from "0" to "1", the switch control circuit 116 connects the switch 117 to a power supply 16, and the current source 103 is driven with a voltage of $V_{cc}1+V_{cc}3=V_{cc}2$ When recording data is "0" or when recording data changes from "1" to "0", similar processing is performed by the control of the switch control circuit 115. Thus, also in the circuitry shown in FIG. 10, power consumption during recording can be reduced as in the case of the circuitry shown in FIG. 6.

The individual components shown in outline or designated by blocks in the drawings are all well known in the recording apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording apparatus, comprising:

first power-supply means having a first output voltage;

second power-supply means having a second output voltage different from the first output voltage, both the first output voltage and the second output voltage being the same polarity;

recording means for recording input digital data on a recording medium using said first power-supply means and said second power-supply means, said recording means including a head element having a first terminal and a second terminal, wherein both said first power-supply means and said second power supply means are connected to said first terminal of said head element, and wherein said recording means changes usage of said first power-supply means and said second power-supply means in accordance with a state of the input digital data.

2. An apparatus according to claim 1, wherein the input digital data comprises data having a high level and a low level.

3. An apparatus according to claim 2, wherein the second output voltage is higher than the first output voltage.

4. An apparatus according to claim 3, wherein said recording means records the input digital data using said first power-supply means in a stationary state in which the input digital data level has not changed from the previous digital data level.

5. An apparatus according to claim 3, wherein said recording means records the input digital data using said second power-supply means in a transient state in which the input digital data changes from the high level to the low level or from the low level to the high level.

6. An apparatus according to claim 2, wherein the second output voltage is lower than the first output voltage.

7. An apparatus according to claim 6, wherein said recording means records the input digital data using only said first power-supply means in a stationary state in which the input digital data level has not changed from the previous digital data level.

8. An apparatus according to claim 6, wherein said recording means records the input digital data using said first power-supply means and said second power-supply means in a transient state in which the input digital data changes from the high level to the low level or from the low level to the high level.

9. An apparatus according to claim 1, wherein said recording means further comprises (i) head means, (ii) a first constant-current source, driven by said first power-supply means, for supplying said head means with current, (iii) a second constant-current source, driven by said second power-supply means, for supplying said head means with current, and (iv) selection means for selectively supplying said head means with current from said first constant-current source or said second constant-current source in accordance with the state of the input digital data.

10. An apparatus according to claim 9, wherein said selection means further comprises potential detection means for detecting a potential of a signal supplied to said head means.

11. An apparatus according to claim 10, wherein said selection means supplies said head means with current from said first constant-current source when the potential of the signal supplied to said head means is lower than a predetermined potential, and wherein said selection means supplies said head means with current from said second constant-current source when the potential of the signal supplied to said head means is higher than the predetermined potential.

12. An apparatus according to claim 11, wherein the predetermined potential is lower than the first output voltage, and is close to the first output voltage.

13. An apparatus according to claim 1, wherein said recording means further comprises (i) head means, (ii) a constant-current source, which can be driven by said first power-supply means and said second power-supply means, for supplying said head means with current, and (iii) control means for performing control of whether said constant-current source is to be driven only by said first power-supply means or by said first power-supply means and said second power-supply means in accordance with the state of the input digital data.

14. An apparatus according to claim 13, wherein said control means drives said constant-current source by only said first power-supply means when the potential of the signal supplied to said head means is lower than a predetermined potential, and wherein said control means drives said constant-current source by said first power-supply means and said second power-supply means when the potential of the signal supplied to said head means is higher than the predetermined potential.

15. An apparatus according to claim 1, further comprising:

a signal processing circuit for compressing an information amount of digital data using said first power-supply means, and for outputting the resultant data as the input digital data.

16. An apparatus according to claim 1, wherein said recording means changes the usage of the power-supply means between an inverting state of the input digital data and a stationary state of the input digital data.

17. A recording apparatus, comprising:

head means for recording data on a recording medium by a current corresponding to input digital data passed through said head means, said head means having two terminals comprising a first terminal and a second terminal;

first power-supply means having a first output voltage;

second power-supply means having a second output voltage higher than the first output voltage both said first power-supply means and said second power supply means are connected to said first terminal of said head means, and control means for selectively applying the first voltage or the second voltage between the terminals of said head means.

18. An apparatus according to claim 17, wherein said first power-supply means further comprises a first voltage source having the first voltage, and a first constant-current source, driven by said first voltage source, for supplying said head means with current, and wherein said second power-supply means further comprises a second voltage source having the first voltage, and a second constant-current source, driven by said first voltage source, for supplying said head means with current.

19. An apparatus according to claim 17, wherein the input digital data comprises data having a high level and a low level.

20. An apparatus according to claim 19, wherein said recording apparatus supplies said head means with current from said first constant-current source in a stationary state in which the input digital data level has not changed from a previous digital data level.

21. An apparatus according to claim 19, wherein said recording apparatus supplies said head means with current from said second constant-current source in a transient state in which the input digital data changes from the high level to the low level or from the low level to the high level.

22. An apparatus according to claim 17, further comprising:

signal processing means for performing predetermined processing for the digital data using said first power-supply means, and for outputting the resultant data as the input digital data.

23. A recording apparatus, comprising:

first power-supply means having a first output voltage;

second power-supply means having a second output voltage different from the first output voltage, both the first output voltage and the second output voltage being the same polarity;

recording means for recording input digital data on a recording medium using said first power-supply means and said second power-supply means, said recording means including a head element having a first terminal and a second terminal, wherein both said first power-supply means and said second power supply means are connected to said first terminal of said head element, and wherein said recording means changes usage of said first power-supply means and said second power-supply means in accordance with whether or not a waveform of the input signal is a pulse-shaped waveform.

24. An apparatus according to claim 23, wherein the second output voltage is higher than the first output voltage.

25. An apparatus according to claim 24, wherein said recording means records the input signal using said second power-supply means when the waveform of the input signal is a pulse-shaped waveform, and wherein said recording means records the input signal usings said first power-supply means when the waveform of the input signal is not a pulse-shaped waveform.

26. An apparatus according to claim 23, wherein the second output voltage is lower than the first output voltage.

27. An apparatus according to claim 26, wherein said recording means records the input signal using said first power-supply means and said second power-supply means when the waveform of the input signal is a pulse-shaped waveform, and wherein said recording means records the input signal using only said first power-supply means when the waveform of the input signal is not a pulse-shaped waveform.

28. A recording apparatus, comprising:

power-supply means being capable of applying to said apparatus a first voltage and a second voltage different from the first voltage;

recording means for recording input digital data on a recording medium using said power-supply means, said recording means including (i) head means having a first side and a second side, and (ii) potential detection means for detecting a potential of a signal supplied to said head means, said power-supply means being capable of applying the first voltage and the second voltage to the first side of said head means, said recording means changing the voltage applied by said power-supply means in accordance with the potential detected by said potential detection means.

29. An apparatus according to claim 28, wherein said recording means further comprises (i) a first constant-current source, driven by the first voltage, for supplying said head means with current, (ii) a second constant-current source, driven by the second voltage, for supplying said head means with current, and (iii) selection means for selectively supplying said head means with current from said first constant-current source or said second constant-current source in accordance with the potential detected by said potential detection means.

30. An apparatus according to claim 29, wherein said selection means supplies said head means with current from said first constant-current source when the potential of the signal supplied to said head means is lower than a predetermined potential, and wherein said selection means supplies said head means with current from said second constant-current source when the potential of the signal supplied to said head means is higher than the predetermined potential.

31. An apparatus according to claim 30, wherein the predetermined potential is lower than the first voltage, and is close to the first voltage.

32. An apparatus according to claim 28, wherein said recording means includes (i) a constant-current source, which can be driven by the first voltage and the second voltage, for supplying said head means with current, and (ii) control means for controlling whether said constant-current source is to be driven by the first voltage or by the second voltage according to the potential detected by said potential detection means.

33. An apparatus according to claim 32, wherein said control means drives said constant-current source by the first voltage when the potential detected by said detection means is lower than a predetermined potential and by said second voltage when the potential detected by said detection means is higher than the predetermined potential.

34. A recording apparatus, comprising:
recording means for recording input digital data on a recording medium by passing a recording current to head means, said recording means changing a direction of the recording current between a first direction and a second, different direction, according to a state of the input digital data;
power-supply means being capable of applying to said head means a first voltage and a second voltage different from the first voltage, both the first voltage and the second voltage being the same polarity, said recording means passing the recording current to said head means in both the first direction and the second direction by the first voltage applied by said power-supply means; and
mode setting means for setting a mode of said apparatus between a plurality of modes including a first mode in which said recording means records the digital data of a static state and said power-supply means applies the first voltage, and a second mode in which said recording means records the digital data of a transient state and said power-supply means applies the second voltage.

35. An apparatus according to claim 34, wherein said mode setting means includes detection means for detecting a potential of a terminal of said head means, and wherein said mode setting means sets the mode of said apparatus according to the potential detected by said detection means.

36. Apparatus according to claim 34, wherein said recording means includes a current source driven by said power-supply means.

37. Apparatus according to claim 34, further comprising signal processing means for processing an input signal and outputting the digital data, said power-supply means applying the first voltage to said signal processing means.

38. Apparatus according to claim 37, wherein said signal processing means comprises compressing means for compressing an information amount of the input signal.

39. Apparatus according to claim 38, wherein said signal processing means comprises error correction coding means for performing an error correction coding operation on the signal compressed by said compressing means.

40. Apparatus according to claim 34, wherein said head means includes a plurality of rotary heads.

41. A recording apparatus, comprising:
recording means for recording, on a recording medium, digital data having a high level and a low level by passing a recording current to a head, said recording means changing a direction of the recording current between a first direction and a second, different direction, according to a state of the digital data;
applying means for applying to the head a first battery voltage and a second battery voltage different from the first battery voltage, both the first battery voltage and the second battery voltage being the same polarity, said recording means passing the recording current to the head in both the first direction and the second direction by the first battery voltage applied by said applying means; and
mode setting means for setting a mode of said apparatus between a plurality of modes including a first mode in which said recording means records the digital data which has not changed from a previous level and said applying means applies the first battery voltage, and a second mode in which said recording means records the digital data which changes from the high level to the low level or from the low level to the high level and said applying means applies the second battery voltage.

42. An apparatus according to claim 41, wherein the control means changes the voltage applied from said applying means so that the voltage applied in the first state is higher than the voltage applied in the second state.

43. Apparatus according to claim 41, wherein said recording means includes a current source driven by said power-supply means.

44. Apparatus according to claim 41, further comprising signal processing means for processing an input signal and outputting the digital data, said applying means applying the first voltage to said signal processing means.

45. Apparatus according to claim 44, wherein said signal processing means comprises compressing means for compressing an information amount of an input signal.

46. Apparatus according to claim 45, wherein said signal processing means comprises error correction coding means for performing an error correction coding operation on the signal compressed by said compressing means.

47. Apparatus according to claim 41, wherein said head means comprises a plurality of rotary heads.

48. A recording apparatus comprising:
first power-supply means having a first output voltage;
second power-supply means having a second output voltage different from the first output voltage;
processing means for processing digital data;
recording means for recording the digital data processed by said processing means on a recording medium by passing a recording current to a head element using said first power-supply means and said second power-supply means, said recording means changing a direction of the recording current between a first direction and second, different direction, according to the digital data, wherein said recording means passes the recording current to the head element in both the first direction and the second direction using said first power-supply means, and wherein said recording means changes usage of said first power-supply means and said second power-supply means according to a state of the digital data.

49. Apparatus according to claim 48, wherein said processing means processes the digital data using said first power-supply means.

50. Apparatus according to claim 48, wherein said processing means comprises encoding means for encoding the digital data, and wherein said recording means records the encoded digital data.

51. Apparatus according to claim 48, wherein said processing means comprises modulating means for modulating the digital data, and wherein said recording means records the modulated digital data.

52. A recording apparatus, comprising:

first power-supply means having a first output voltage;

second power-supply means having a second output voltage different from the first output voltage;

recording means for recording the digital data processed by said processing means on a recording medium by passing a recording current to a head element using said first power-supply means and said second power-supply means, said recording means changing a direction of the recording current between a first direction and a second direction different from the first direction, according to the digital data, wherein said recording means passes the recording current to the head element in both the first direction and the second direction using said first power-supply means; and potential detecting means for detecting a potential of a signal supplied to the head element and wherein said recording means changes usage of said first power-supply means and said second power-supply means according to the detection output of said potential detecting means.

* * * * *

UNITED STATES PATENT AND TRADEMARK OFFICE
CERTIFICATE OF CORRECTION

PATENT NO. : 5,991,105

DATED : November 23, 1999

INVENTOR(S) : YOSHIYUKI SASAKI

It is certified that error appears in the above-identified patent and that said Letters Patent is hereby corrected as shown below:

ON THE COVER PAGE
Insert:
--[*] Notice: This patent issued on a continued prosecution application filed under 37 CFR 1.53(d), and is subject to the twenty year patent term provisions of 35 U.S.C. 154(a)(2).--.

COLUMN 5
Line 18, "is;" should read --is--.
Line 45, "turnes" should read --turns--.

Signed and Sealed this

Thirtieth Day of January, 2001

Attest:

Q. TODD DICKINSON

*Attesting Officer*  *Director of Patents and Trademarks*